United States Patent [19]
Woertz

[11] 4,163,044
[45] Jul. 31, 1979

[54] METHOD FOR REMOVING HYDROGEN SULFIDE FROM STEAM

[75] Inventor: Byron B. Woertz, Claremont, Calif.

[73] Assignee: Union Oil Company of California, Brea, Calif.

[21] Appl. No.: 854,486

[22] Filed: Nov. 25, 1977

[51] Int. Cl.$^2$ .................................................. B01D 53/34
[52] U.S. Cl. ..................... 423/234; 423/224; 423/232; 423/551
[58] Field of Search ............... 423/210, 224, 232, 234, 423/220, 551

[56] References Cited
U.S. PATENT DOCUMENTS

| 3,969,479 | 7/1976 | Lonnes et al. | 423/224 |
| 4,123,506 | 10/1978 | Spevack | 423/566 |

FOREIGN PATENT DOCUMENTS 421970  1/1935  United Kingdom ............... 423/232

OTHER PUBLICATIONS

Castrantes, "Hydrogen Sulfide Abatement of Geothermal Wells", Geothermal Environmental Seminar, Oct. 28, 1976.

Primary Examiner—Earl C. Thomas
Attorney, Agent, or Firm—Richard C. Hartman; Dean Sandford

[57] ABSTRACT

A process for reducing the hydrogen sulfide content of steam, such as steam produced from a subterranean geothermal reservoir, in which the steam is contacted with an aqueous, alkaline solution having a temperature approximating that of the steam to absorb hydrogen sulfide from the steam which is thereafter discharged or utilized in a power generation plant. Hydrogen peroxide is introduced into a cooled portion of the aqueous, alkaline solution to reduce the hydrogen sulfide content thereof and then the aqueous alkaline solution is heated to about the temperature of the steam and recycled into contact with the hydrogen sulfide-containing steam. The temperature of the cooled portion of the aqueous, alkaline solution into which hydrogen peroxide is introduced is such that thermal decomposition of hydrogen peroxide is substantially prevented.

13 Claims, 2 Drawing Figures

METHOD FOR REMOVING HYDROGEN SULFIDE FROM STEAM

BACKGROUND OF THE INVENTION

This invention relates to the treatment of steam, such as that produced from a subterranean geothermal reservoir, and more particularly, to a method for reducing the hydrogen sulfide content of the steam thereby rendering the steam environmentally harmless.

In light of the problem of diminishing hydrocarbon fuel reserves, there is a developing emphasis to exploit alternative energy sources, such as geothermal energy. Geothermal energy is generated by producing steam, hot water, or hot aqueous brines from a subterranean geothermal reservoir and utilizing the produced fluid in conjunction with surface equipment, such as turbines and heat exchangers, to derive useful energy therefrom.

Often the steam produced either during the drilling of a geothermal well or from a completed geothermal well contains significant amounts of hydrogen sulfide, and as such is not environmentally acceptable for subsequent discharge into the atmosphere. Another environmental problem is encountered in the utilization of geothermal steam in power plants of either the condensing or non-condensing type, in that the effluent steam from the turbine exhaust, or the non-condensible gases in the case of the condensing turbine plants, contain hydrogen sulfide and other deleterious gaseous constituents.

Several prior art processes relate to the removal of hydrogen sulfide from gaseous streams. It is well known to remove hydrogen sulfide from a gaseous stream by contacting the stream with an aqueous alkaline solution of hydrogen peroxide. It is also disclosed in the prior art to remove hydrogen sulfide from geothermal steam prior to energy derivation therefrom. A commonly assigned, copending U.S. patent application, Ser. No. 735,768, filed Oct. 26, 1976, by Byron B. Woertz, discloses contacting geothermal steam produced during geothermal well drilling operations with aqueous solutions of hydrogen peroxide and sodium hydroxide to abate the hydrogen sulfide present in the produced geothermal steam.

Although the prior art discloses processes for removal of hydrogen sulfide from gaseous streams and geothermal steam by contacting the same with aqueous solutions of hydrogen peroxide and sodium hydroxide, none of these processes disclose reducing heat loss from the gaseous streams or geothermal steam which occurs upon contacting the same with the aqueous treating solution. Since recovering thermal energy from steam is of prime importance in power generation processes utilizing steam, a need exists to develop a process for removing hydrogen sulfide from steam, especially geothermal steam, wherein heat loss from the steam during removal of hydrogen sulfide therefrom is effectively reduced.

Further, none of the prior art processes involves the conservation of hydrogen peroxide and sodium hydroxide reactants which are typically employed in amounts in excess of the stoichoimetric amount required for reaction with hydrogen sulfide. Since these chemicals are relatively expensive in a large scale operation, there exists a need to develop a process which will efficiently conserve hydrogen peroxide and alkaline materials so that such chemicals are substantially entirely consumed in abating hydrogen sulfide from geothermal steam.

Accordingly, it is an object of this invention to provide a method for abating hydrogen sulfide from steam which does not effect a substantial loss of thermal energy from the steam.

It is also an object of this invention to provide a process for removing hydrogen sulfide from steam wherein the constituents of the aqueous solution utilized to absorb hydrogen sulfide from the steam are conserved.

It is a further object of this invention to provide for more efficient contact between the aqueous absorption solution and the steam while still conserving the constituents of the absorption solution.

It is a still further object of the present invention to substantially eliminate the thermal decomposition of hydrogen peroxide when utilizing hydrogen peroxide in a process to abate hydrogen sulfide from steam.

These and other objects and advantages of the invention will be apparent from the following detailed description and drawing.

BRIEF SUMMARY OF THE INVENTION

Briefly, the present invention relates to a process for reducing the hydrogen sulfide content of steam, such as geothermal steam, wherein the steam is contacted with an aqueous, alkaline absorption solution having a temperature approximating that of the steam to absorb hydrogen sulfide from the steam, and the treated steam is thereafter discharged directly to the atmosphere, or the steam and/or the non-condensible gaseous portion thereof is discharged to the atmosphere after utilization in a power plant or other energy extraction plant. In carrying out the process, hydrogen peroxide is introduced into the aqueous alkaline solution containing absorbed hydrogen sulfide, or a portion thereof, to reduce the hydrogen sulfide content of the solution, thereby forming environmentally harmless reaction products. Thereafter, the aqueous, alkaline solution is heated to about the temperature of the steam and recirculated into contact with the hydrogen sulfide-containing steam. The temperature of the aqueous alkaline solution, or portion thereof into which hydrogen peroxide is introduced, is such that thermal decomposition of hydrogen peroxide is substantially prevented. Also, the steps of contacting the steam with an aqueous, alkaline solution are preferably performed within an absorption tower containing perforated plates. Further, a relatively small bleed must be drawn from the aqueous, alkaline solution to prevent an excessive buildup of corrosive or scale-forming reaction products, and, therefore, an appropriate amount of makeup solution must be added to the aqueous, alkaline solution.

BRIEF DESCRIPTION OF THE DRAWINGS

The invention will be more readily understood by reference to the accompanying drawing in which.

DETAILED DESCRIPTION

Geothermal steam produced from a subterranean geothermal reservoir or derived by flashing geothermal brines produced therefrom may contain a wide variety of impurities, such as, for example, hydrogen sulfide, carbon dioxide, ammonia, nitrogen, hydrogen, methane and relatively small concentrations of other impurities.

These impurities cause several problems when utilizing the produced geothermal steam for power generation in a surface power plant. These problems include solids precipitation and deposition, corrosion, and ambient air pollution. In particular, emitting hydrogen sulfide present in the produced geothermal steam to the atmosphere can create excessive concentrations of the same in the ambient air, thereby creating an environmentally unacceptable conditon. The present invention relates to a method of removing hydrogen sulfide from produced geothermal steam to obviate the environmental problems posed by hydrogen sulfide emission. The term "produced geothermal steam" as used herein is meant to include superheated and saturated steam produced from so-called "dry" reservoirs, and steam derived from flashing hot water and hot brine produced from subterranean geothermal reservoirs.

Figure 1:
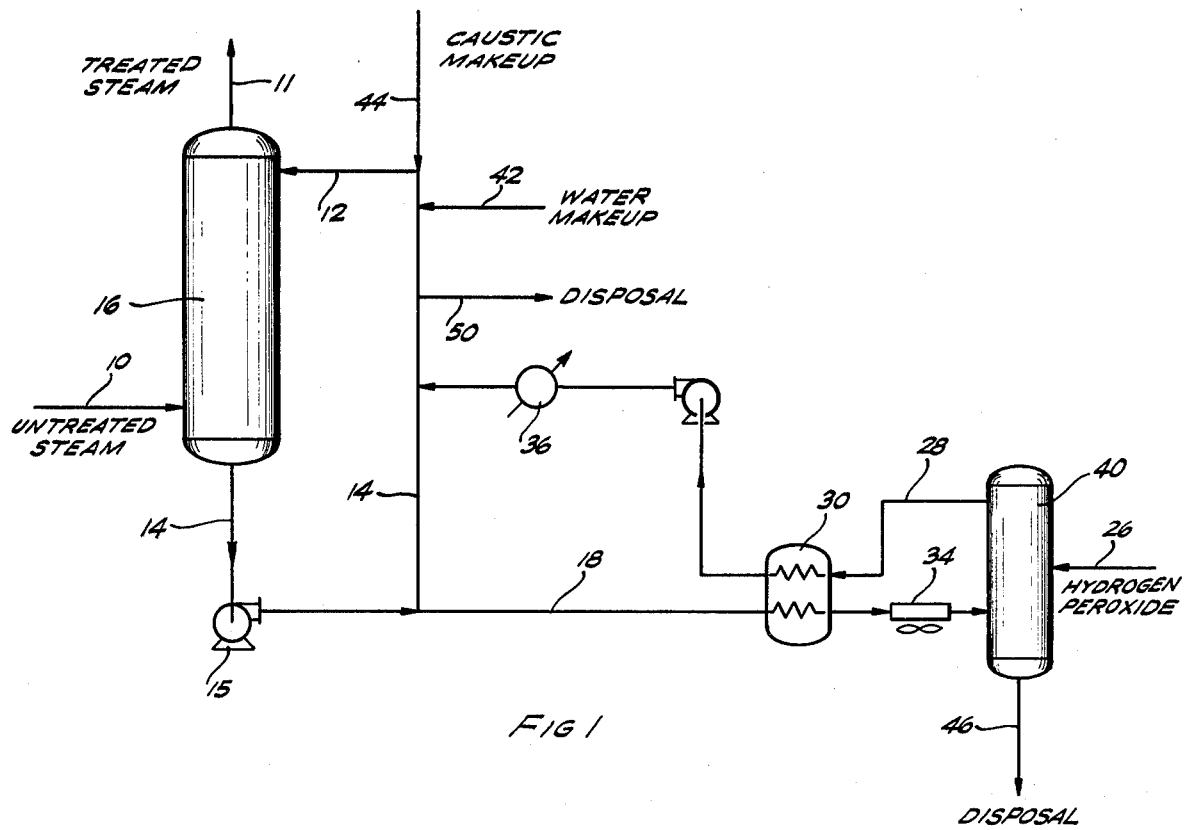
FIG. 1 is a schematic flow diagram of the hydrogen sulfide removal process of the present invention.

Referring now to FIG. 1, produced geothermal steam enters a suitable contactor 16 near the bottom thereof via conduit 10. The produced geothermal steam may pass through conventional separators and/or knock out drums, not shown, in any feasible flow arrangement prior to being introduced into the contactor 16 so as to reduce the particulate content of the steam to a relatively low value which is acceptable for treating purposes, and to flash the hot geothermal liquids to steam. The particular composition, temperature and pressure of the produced geothermal steam will vary depending upon the subterranean geothermal reservoir produced and the particular pretreatment employed. However, as previously noted, the steam will contain gaseous impurities. Usually, a relatively large quantity of hydrogen sulfide and carbon dioxide, as for example, 200 ppm hydrogen sulfide and 6,000 ppm carbon dioxide, can be present in the produced steam. Further, the steam will be at a temperature of about 212° F. to about 700° F. and in most instances will be at a temperature of about 212° F. to about 400° F.

An aqueous alkaline circulating solution, being at a temperature approximating that of the steam entering contactor 16, is introduced into the contactor near the top thereof via conduit 12. The aqueous alkaline circulating solution flows downwardly through the contactor, thereby countercurrently contacting the rising steam and absorbing hydrogen sulfide and other impurities from the steam. The alkaline circulating solution having hydrogen sulfide and other impurities absorbed therein exits from the bottom of the contactor via conduit 14 and the hydrogen sulfide-lean geothermal steam having a reduced hydrogen sulfide content exits the upper portion of the contactor through 11 and is discharged directly into the ambient air or conveyed to a power plant or other facility for recovery of thermal energy. Contactor 16 may be any suitable gas absorption unit, as conventionally utilized in the art. Preferably, a tower containing perforated plates or float-valve trays is employed.

In accordance with the present invention, the pregnant alkaline circulating solution, i.e., the aqueous alkaline solution containing absorbed gaseous constituents, such as hydrogen sulfide and carbon dioxide, is recycled to the top of contactor 16 by any suitable means, such as pump 15, and is then reintroduced into the contactor via conduit 12. When necessary, suitable alkaline material and water are added, via conduits 42 and 44, respectively, as makeup to the circulating solution as the solution is recycled to the contactor. Alternatively, one aqueous alkaline solution of a predetermined concentration may be added to the recycled circulating solution to serve as both water and alkaline material makeup. The alkaline material initially employed and later added, as decribed above, is selected from the hydroxides of the alkali metals. Preferably, sodium or potassium hydroxide, and most preferably, sodium hydroxide is employed as the alkaline material since the sulfides thereof, formed in accordance with the reaction (2), are highly soluble and will readily react with hydrogen peroxide in accordance with reaction hereinafter described. The alkaline material is preferably added as an aqueous solution thereof. It appears that the hydrogen sulfide, carbon dioxide and alkaline material (e.g., sodium hydroxide) present in the alkaline recirculating solution react in accordance with the following general equations:

$$2NaOH + CO_2 \rightarrow Na_2CO_3 + H_2O \qquad (1)$$

$$Na_2CO_3 + H_2S \rightleftharpoons NaHS + NaHCO_3 \qquad (2)$$

$$Na_2CO_3 + CO_2 + H_2O \rightleftharpoons 2NaHCO_3 \qquad (3)$$

The absorbed carbon dioxide reacts with the alkaline material such as sodium hydroxide, to form sodium carbonate and water. Thereafter, the sodium carbonate may react with hydrogen sulfide to form sodium hydrosulfide and sodium bicarbonate in accordance with reaction (2). Or the sodium carbonate may combine with carbon dioxide and water to form sodium bicarbonate in accordance with reaction (3). Thus, while the aqueous alkaline solution employed as the absorption solution is prepared by diluting the alkali metal hydroxide to the proper concentration, in fact, the solution employed in the absorption step is, at equilibrium, a solution of an alkali metal carbonate and/or bicarbonate containing the absorbed hydrogen sulfide in the form of alkali metal hydrosulfide. The exact composition of the aqueous alkali solution employed in the absorption step will depend upon the composition of the untreated steam, the amount and type of deleterious materials absorbed therefrom, the extent to which the solution is regenerated, the amount of bleed, and other operating conditions employed.

In accordance with one embodiment of the process of the present invention as illustrated in FIG. 1, a side stream of the pregnant circulating solution is withdrawn from conduit 14 via conduit 18 and is cooled before addition of hydrogen peroxide thereto. In particular, the side stream passes via conduit 18 through a first heat exchanger 30 wherein it is cooled by indirect heat exchange with the outlet stream of oxidizer 40. As it is preferred to cool the side stream to a temperature of, for example, 150° F. or below, it may be necessary to further cool the side stream prior to entry into the oxidizer by any suitable means such as, for example, air cooler 34. The side stream is then passed to oxidizer 40 while hydrogen peroxide is simultaneously injected into the oxidizer via conduit 26. In oxidizer 40, the hydrosulfides present in the circulating solution are oxidized to sulfites and/or sulfates as hereinafter described. The oxidized side stream is passed via conduit 28 to heat exchanger 30 to be reheated by heat exchange with the incoming side stream as previously described. It is necessary to heat the oxidized side stream in conduit 28 to maintain the operating temperature of the pregnant circulating solution in conduit 14 upon addition thereto. This operating temperature is selected such that the temperature of the circulating solution is maintained at about the temperature of the geothermal steam entering the contactor. The upper limit of this operating temperature may be dictated by the boiling point of the circulating solution, for example about 400° F. when employing a sodium hydroxide solution at a system operating pressure of 135 psia. In instances where the temperature of the steam produced is higher than the boiling point of the circulating solution, it will be necessary to cool the steam by deriving useful heat therefrom prior to entry of the steam into the contactor so that the circulating solution can be heated to the temperature of the steam entering the contactor without changing the phase relationship of the solution. In this manner, substantially no steam is condensed into the solution in the contactor, nor is any substantial amount of the solution vaporized upon contact with the steam. Thus, water balance problems are substantially eliminated, and heat loss from the geothermal steam due to contact with the solution may be effectively reduced, and more particularly may be substantially eliminated. The regulation of the temperature of the circulating solution can be accomplished by any suitable means, such as by heat exchanger 36. This heat exchanger can utilize any readily available source of heat from the power generation plant or other source which possesses enough thermal energy to heat the side stream in conduit 28 to the desired temperature as aforedescribed, or a fired heater or an electric heater can be employed. Alternatively, the oxidized solution may be added directly to the circulating solution after passing through heat exchanger 30 without being further heated. In this mode, the entire circulating solution is heated to the aforedescribed operating temperature immediately before being introduced into the contactor by any suitable means, such as a heat exchanger (not shown), or the circulating solution can be returned to the contactor without further heating.

The hydrosulfides in side stream 18 are believed to react with hydrogen peroxide and alkaline material, e.g. sodium hydroxide, in oxidizer 40 in accordance with the following general equations:

$$NaHS + 4H_2O_2 \rightarrow NaHSO_4 + 4H_2O \qquad (4)$$

$$NaHSO_4 + NaOH \rightarrow Na_2SO_4 + H_2O \qquad (5)$$

$$NaHS + 3H_2O_2 \rightarrow NaHSO_3 + 3H_2O \qquad (6)$$

$$NaHSO_3 + NaOH \rightarrow Na_2SO_3 + H_2O \qquad (7)$$

As an example, sodium hydrosulfide may react with hydrogen peroxide in the oxidizer to form sodium bisulfate and water as set forth in reaction (4) and the sodium bisulfate may react with sodium hydroxide present in the side stream to form sodium sulfate in accordance with (5). Alternatively, the sodium hydrosulfide may react with hydrogen peroxide to form sodium bisulfite and water, as in reaction (6), and the sodium bisulfite may further react with sodium hydroxide to form sodium sulfite and water as in reaction (7). These sulfate and/or sulfite reaction products thus formed may be discharged in any suitable manner, such as by reinjection into a subterranean formation. Or these reaction products may be surface discharged since they do not pose environmental problems, such as hazardous and obnoxious odors, inter alia.

It should be noted that the process of the present invention conserves alkaline constituents by providing a more efficient contact with geothermal steam by utilizing a multi-stage gas-liquid contactor, and, more particularly, by recycling the aqueous alkaline solution so as to utilize substantially all of the alkaline constituents of the washing solution in the reaction with steam impurities. Hydrogen peroxide is conserved by treating only a portion of the circulating solution with this agent. Additionally, hydrogen peroxide is conserved since the side stream of circulating solution to be treated is sufficiently cooled to substantially prevent thermal decomposition of hydrogen peroxide upon addition thereto. Hydrogen peroxide decomposes rapidly at the temperature of the circulating solution (e.g., 350° F.) but will decompose a negligible amount when introduced into the side stream which is cooled to about 150° F. or below. Therefore, substantially all of the hydrogen peroxide is consumed in the reaction with sulfides contained in the side stream.

Figure 2:
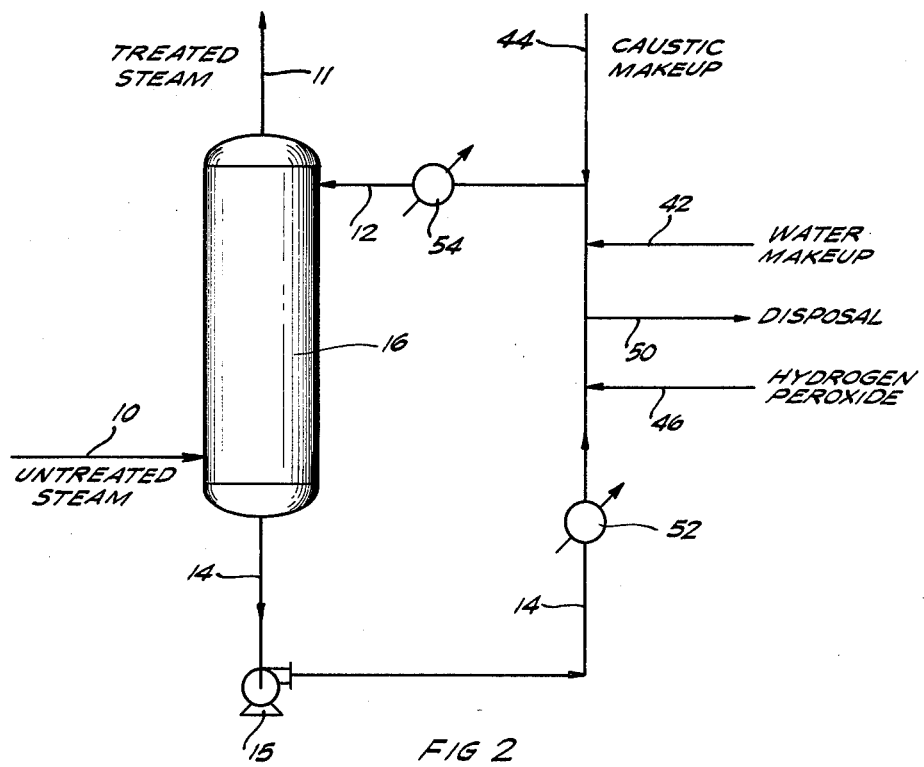
FIG. 2 as a schematic flow diagram of an alternate embodiment of the hydrogen sulfide removal process of the present invention.

In an alternative embodiment of the process of the present invention, as illustrated in FIG. 2, the entire circulating solution is cooled to about 150° F. or below by any suitable means such as, for example, heat exchanger 52. Thereafter, hydrogen peroxide is added to the circulating solution via conduit 46. The solution is then heated to the operating temperature aforedescribed by any suitable means such as, for example, heat exchanger 54. The amount of hydrogen peroxide added is the same as would be necessary to treat a side stream as in the preceding embodiment. It also is apparent that the entire circulating solution may pass in a heat exchange relationship with itself, as for example a heat exchanger similar to 30 in FIG. 1, before and after addition of hydrogen peroxide thereto. In this manner, the heat requirements and attendant operating costs of heat exchangers 52 and 54 are reduced.

In all embodiments of the present invention, a relatively small bleed stream must be drawn from the circulating solution and disposed of so as to prevent an excessive buildup of sulfites and/or sulfates formed in accordance with the reactions set forth infra. Such excessive buildup may be defined in terms of the threshold concentration which causes excessive corrosion to the system disclosed herein and/or which causes deleterious precipitation of sulfites and/or sulfates and resultant scaling within the system. This threshold concentration will vary according to operating parameters of the process of the present invention and the physical and chemical characteristics of the steam. The bleed stream may be drawn off at any point after hydrogen peroxide is injected into the pregnant circulating solution, such as, for example, via conduit 50 in FIG. 2, or at any point after hydrogen peroxide has been injected into a portion of circulating solution, such as, for example, via conduit 50 in FIG. 1. As previously noted, these sulfates and the sulfites present in the bleed will not create environmental problems upon discharge.

All conduits and process equipment such as contactor 16 and the various heat exchangers and pumps which are utilized in the present invention to transport the aqueous circulating solution, or any portion thereof, and the geothermal steam, are insulated by any suitable means, such as, for example, a fiberglass covering, to minimize heat loss encountered in such transportation.

EXAMPLE

The following example is illustrative of the application of the method of the present invention to removing hydrogen sulfide from steam.

Geothermal steam produced from a subterranean geothermal reservoir is introduced at 350° F. and 135 psia into an absorber near the bottom thereof. The geothermal steam contains about 200 ppm of hydrogen sulfide and about 6000 ppm of carbon dioxide. Simultaneously, an aqueous solution of sodium hydroxide, having a sodium hydroxide concentration of 20 grams per liter of solution, is introduced into the absorber near the top thereof. The aqueous solution countercurrently contacts the rising steam in the absorber, thereby absorbing a significant portion of the hydrogen sulfide content of the steam, e.g., 50 percent, and exits the bottom of the contactor. The treated steam exits the top of the contactor at about 350° F. and about 132 psia and is utilized thereafter in a conventional surface power generation plant.

The absorber is a vertical liquid/gas contacting tower which contains 10 float valve trays. Alternatively, the absorber can be packed with, for example, 20 feet of 1½-inch to 2-inch size Pall ring packing.

About 10 percent of the aqueous solution of sodium hydroxide having hydrogen sulfide and other impurities such as carbon dioxide absorbed therein, is passed through a first heat exchanger and an air cooler to lower the temperature thereof to about 150° F. Thereafter, this side stream is introduced into an oxidizer and hydrogen peroxide is simultaneously introduced therein. Approximately twice the stoichoimetric amount of hydrogen peroxide needed to oxidize each sulfide ion present in the side stream is utilized to allow for hydrogen peroxide reaction with impurities in the side stream. Therefore, approximately 8 moles of hydrogen peroxide are utilized per mole of sulfide ion present in the side stream.

The oxidized side stream exits the oxidizer, passes through a heat exchanger to indirectly heat the incoming side stream and is thereafter combined with the circulating aqueous solution. The circulating solution is recycled to a heat exchanger, is heated therein to a temperature of about 350° F. and is immediately introduced into the absorber so as to minimize heat loss of the solution prior to entry into the absorber.

The circulating solution is recycled at a rate of about 10 gallons per MCF of steam introduced into the absorber. As the caustic concentration of the aqueous circulating solution decreases, a corresponding amount of sodium hydroxide is added as caustic makeup to the solution. This aqueous solution of sodium hydroxide also serves as water makeup for the circulating solution.

When the concentration of sodium sulfate (which is formed in the oxidizer) in the circulating solution reaches 100 gm per liter of solution, a small bleed stream is taken off the side stream as it exits the oxidizer. This bleed is drawn off the side stream at a rate (e.g., 0.5 gallons per 1000 lb. of steam treated) sufficient to reduce the concentration of sodium sulfate in the entire circulating solution to a level which does not pose corrosion and/or deposition problems. To compensate for loss of water and caustic in the bleed, a corresponding quantity of an aqueous alkaline solution is added as makeup to the circulating solution.

Although the present invention has been described throughout this specification in terms of a process for treating geothermal steam, the process of the present invention is not intended to be limited to treating geothermal steam. Instead, the process of the present invention can be utilized to treat any type of steam containing gaseous impurities, such as hydrogen sulfide and carbon dioxide, regardless of the origins of the steam.

While various embodiments and modifications of this invention have been described in the foregoing description, further modifications will be apparent to those skilled in the art. Such modifications are included within the scope of this invention as defined by the following claims.

I claim:

1. A process for continuously treating hydrogen sulfide-containing steam to reduce the hydrogen sulfide content of the steam, comprising:
   (a) contacting said hydrogen sulfide-containing steam in a contacting stage with an aqueous alkaline solution comprised of a water-soluble alkali metal hydroxide so as to absorb hydrogen sulfide from said steam and produce a treated steam having a reduced hydrogen sulfide content, said solution being introduced into contacting stage at a temperature between about 212° F. and 700° F. which is about the temperature of the steam entering said contacting stage;
   (b) withdrawing said aqueous, alkaline solution containing absorbed hydrogen sulfide from said contacting stage;
   (c) introducing hydrogen peroxide into at least a portion of said aqueous alkaline solution containing absorbed hydrogen sulfide to effect a reduction in the sulfide content of the solution and form a treated solution containing environmentally harmless reaction products, said portion of said aqueous solution to which said hydrogen peroxide is introduced being at a temperature which substantially prevents thermal decomposition of the hydrogen peroxide introduced thereinto;
   (d) heating said treated solution to about the temperature of the steam entering the contacting stage; and
   (e) recycling said heated, treated solution to said contacting stage to provide at least a portion of said aqueous alkaline solution introduced thereinto.

2. The process defined in claim 1 wherein said treated solution is heated in step (d) to between about 212° F. and 400° F.

3. The process defined in claim 1 wherein said water-soluble alkali metal hydroxide is sodium hydroxide.

4. The process defined in claim 1 wherein prior to step (c) said portion of said aqueous, alkaline solution is cooled to a temperature of about 150° F. or below.

5. The process defined in claim 1 wherein said hydrogen peroxide is introduced into said portion of said aqueous, alkaline solution in an amount sufficient to treat only a portion of the sulfide content of the hydrogen sulfide-containing aqueous alkaline solution withdrawn from said contacting stage.

6. The process defined in claim 1 further comprising,
   (f) discharging a predetermined quantity of said treated aqueous alkaline solution; and
   (g) adding water and a water-soluble alkali metal hydroxide to said treated solution recycled to said contacting stage in an amount sufficient to make up the water and alkaline constituent loss concomitant with discharging said quantity.

7. The process defined in claim 1 wherein said hydrogen sulfide-containing steam is geothermal steam.

8. A process for continuously treating hydrogen sulfide-containing geothermal steam to reduce the hydrogen sulfide content thereof, comprising:

(a) contacting said geothermal steam in a contacting stage with an aqueous alkaline solution comprised of a water-soluble alkali metal hydroxide as to absorb hydrogen sulfide from said steam and produce a treated steam having a reduced hydrogen sulfide-content, said solution being introduced into said contacting stage at a temperature between about 212° F. and 400° F. which is about the temperature of said steam entering said contacting stage;

(b) withdrawing said aqueous alkaline solution containing absorbed hydrogen sulfide from said contacting stage;

(c) cooling at least a portion of said hydrogen sulfide-containing aqueous alkaline solution to a temperature of about 150° F. or below;

(d) introducing hydrogen peroxide into said cooled hydrogen sulfide-containing aqueous alkaline solution to effect a reduction in the sulfide content of the solution and form a treated solution containing environmentally harmless reaction products;

(e) discharging a predetermined quantity comprising at least a portion of said treated solution to a disposal location;

(f) heating the remainder of said treated solution to about the temperature of the steam entering the contacting stage; and (g) recycling said heated, treated solution to said contacting stage to provide at least a portion of said aqueous alkaline solution introduced thereto.

9. The process of claim 8 wherein said alkali metal hydroxide is sodium hydroxide.

10. The process defined in claim 8 wherein the entire volume of hydrogen sulfide-containing aqueous alkaline solution withdrawn from said contacting stage is cooled in step (c).

11. The process defined in claim 8 wherein only a portion of hydrogen sulfide-containing aqueous alkaline solution withdrawn from said contacting stage is cooled in step (c).

12. The process defined in claim 8 further comprising:
(h) adding water and a water soluble alkali metal hydroxide to said treated solution recycled to said contacting stage in an amount sufficient to make up the water and alkaline constituent loss concomitant with discharging said quantity.

13. A process for continuously treating hydrogen sulfide-containing geothermal steam to reduce the hydrogen sulfide content thereof, comprising:

(a) countercurrently contacting said geothermal steam in a contacting stage with an aqueous alkaline solution comprised of water-soluble sodium hydroxide so as to absorb hydrogen sulfide from said steam and produce a treated steam having a reduced hydrogen sulfide content, said solution being at a temperature between about 212° F. and 400° F. which is about the temperature of said hydrogen sulfide-containing steam;

(b) withdrawing said aqueous alkaline solution containing absorbed hydrogen-sulfide from said contacting stage and dividing said withdrawn solution into a first portion and a second portion;

(c) cooling said second portion of said solution to a temperature of about 150° F. or below;

(d) introducing hydrogen peroxide into said cooled second portion of said solution to effect a reduction in the sulfide content of the solution and form a treated solution containing environmentally harmless reaction products;

(e) discharging a predetermined quantity comprising at least a portion of said treated solution to a disposal location;

(f) heating the undischarged portion of said treated solution to a temperature sufficient to raise the temperature of both the first portion and the undischarged portion upon combining said portions to about the temperature of the geothermal steam entering said contacting stage;

(g) combining said first portion and said heated undischarged portion;

(h) recycling said combined portions to said contacting stage to provide at least a portion of said aqueous alkaline solution introduced thereinto; and (i) adding water and sodium hydroxide to said combined portions recycled to said contacting stage in an amount sufficient to make up the water and sodium hydroxide loss concomitant with discharging said quantity.

* * * * *